(12) United States Patent
Querejeta Andueza et al.

(10) Patent No.: US 10,760,697 B2
(45) Date of Patent: Sep. 1, 2020

(54) REGULATING VALVE FOR A GAS COOKING APPLIANCE AND GAS COOKING APPLIANCE INCORPORTATING SAID REGULATING VALVE

(71) Applicant: Copreci, S. Coop., Aretxabaleta (ES)

(72) Inventors: Felix Querejeta Andueza, Hendaye (FR); Imanol Arriola-Bengoa Unzueta, Erentxun (ES)

(73) Assignee: COPRECI, S. COOP., Aretxabaleta (ES)

( * ) Notice: Subject to any disclaimer, the term of this patent is extended or adjusted under 35 U.S.C. 154(b) by 60 days.

(21) Appl. No.: 16/039,959

(22) Filed: Jul. 19, 2018

(65) Prior Publication Data
US 2018/0320795 A1 Nov. 8, 2018

Related U.S. Application Data

(63) Continuation of application No. PCT/EP2017/054050, filed on Feb. 22, 2017.

(30) Foreign Application Priority Data

Feb. 24, 2016 (EP) ..................... 16382078

(51) Int. Cl.
*F16K 3/08* (2006.01)
*F23N 1/00* (2006.01)
(Continued)

(52) U.S. Cl.
CPC ............ *F16K 11/074* (2013.01); *F16K 3/085* (2013.01); *F16K 31/041* (2013.01); *F23K 5/147* (2013.01);
(Continued)

(58) Field of Classification Search
CPC .......... F16K 11/074; F16K 3/085; F16K 3/08; F16K 5/10; F16K 5/103; F16K 5/106;
(Continued)

(56) References Cited

U.S. PATENT DOCUMENTS 2,780,833 A 2/1957 Braunlich
3,014,489 A 12/1961 Lamp
(Continued)

FOREIGN PATENT DOCUMENTS

EP 2299156 A2 3/2011
EP 2908053 A1 8/2015
(Continued)

OTHER PUBLICATIONS

International Search Report and Written Opinion in corresponding International Application No. PCT/EP2017/054050, dated May 17, 2017.
(Continued)

*Primary Examiner* — Kelsey E Cary
(74) *Attorney, Agent, or Firm* — Edell, Shapiro & Finnan, LLC (57) ABSTRACT

Regulating valve for a gas cooking appliance according to one embodiment includes a valve body with an inlet conduit, at least one outlet conduit and an inner cavity in fluid communication with the inlet conduit. The regulating valve also includes a rotating disc in contact with a wall of the valve body that partially defines the inner cavity. The rotating disc includes at least one connecting opening for regulating the gas flow between the inner cavity and the outlet conduit by means of rotation. Operating means is connected to the rotating disc for rotating it. The regulating valve is adapted for supplying different types of combustible gas, the rotating disc being arranged in a different angular
(Continued)

position, depending on the type of gas to be supplied, when the operating means is arranged in a reference position.

20 Claims, 10 Drawing Sheets

(51) Int. Cl.
*F23K 5/14* (2006.01)
*F16K 11/074* (2006.01)
*F16K 31/04* (2006.01)

(52) U.S. Cl.
CPC .... *F23N 1/007* (2013.01); *F23K 2900/05002* (2013.01); *F23N 2235/16* (2020.01); *F23N 2235/24* (2020.01); *F23N 2241/08* (2020.01)

(58) Field of Classification Search
CPC ........... F23K 5/147; F23K 2900/05002; F23N 1/007; F23N 2241/08; F23N 2235/16; F23N 2235/24
USPC ................................................ 251/206, 207
See application file for complete search history.

(56) References Cited

U.S. PATENT DOCUMENTS

| | | | |
|---|---|---|---|
| 3,092,142 A | 6/1963 | Willson | |
| 3,589,399 A | 6/1971 | Vignes | |
| 3,949,966 A * | 4/1976 | Fabish | ................... A61M 16/20 251/206 |
| 4,191,281 A | 3/1980 | Nishikawa et al. | |
| 4,219,049 A | 8/1980 | Skelly | |
| 5,419,419 A | 5/1995 | Macpherson | |
| 6,726,175 B1 | 4/2004 | Saba et al. | |
| 2006/0175566 A1 | 8/2006 | Albizuri | |
| 2015/0377380 A1 | 12/2015 | Li | |

FOREIGN PATENT DOCUMENTS

| | | |
|---|---|---|
| GB | 1299086 A | 12/1972 |
| WO | 2013080116 A2 | 6/2013 |

OTHER PUBLICATIONS

Extended European Search Report in corresponding European Application No. 16382078.0, dated Aug. 5, 2016.

* cited by examiner

REGULATING VALVE FOR A GAS COOKING APPLIANCE AND GAS COOKING APPLIANCE INCORPORTATING SAID REGULATING VALVE

CROSS-REFERENCE TO RELATED APPLICATIONS

The present application relates to and claims the benefit and priority to International Application. No. PCT/EP2017/054050, filed Feb. 22, 2017, which claims the benefit and priority to European Application No. EP16382078.0, filed Feb. 24, 2016.

TECHNICAL FIELD

The present invention relates to regulating valves for a gas cooking appliance and to gas cooking appliances incorporating said regulating valves.

BACKGROUND

Regulating valves for gas cooking appliances are known to comprise a rotating disc with connecting openings, such that rotation of the rotating disc allows regulating the gas flow of the valve between an inlet conduit and an outlet conduit of the valve.

International Publication No. WO2013080116A2 discloses a regulating valve for a gas cooking appliance comprising a valve body with an inlet conduit through which gas is supplied, and at least one outlet conduit, and an inner cavity in fluid communication with the inlet conduit, and a rotating disc with a surface in contact with a contact surface of the inner cavity of the valve body, and capable of rotating with respect to the surface of the inner cavity, the surface of the rotating disc and the contact surface of the inner cavity being arranged in a leak-tight manner. The rotating disc comprises a plurality of connecting openings for regulating the gas flow between the inner cavity and the outlet conduit of the valve body by means of rotation of the rotating disc. The regulating valve also comprises operating means connected to the rotating disc for operating the rotating disc.

SUMMARY OF THE DISCLOSURE

According to one embodiment a regulating valve is provided that comprises a valve body with an inlet conduit through which gas is supplied, and at least one outlet conduit, and an inner cavity in fluid communication with the inlet conduit; a rotating disc with a surface in contact with a contact surface of the inner cavity of the valve body, and capable of rotating with respect to the surface of the inner cavity, the surface of the rotating disc and the contact surface of the inner cavity being arranged in a leak-tight manner, the rotating disc comprising at least one connecting opening for regulating the gas flow between the inner cavity and the outlet conduit of the valve body by means of rotation of the rotating disc; and operating means connected to the rotating disc for operating the rotating disc.

The valve is adapted for supplying different types of combustible gas, the rotating disc being arranged in the cavity at different angular position, depending on the type of gas to be supplied, when the operating means of the valve is arranged in a reference position.

The valve is adapted to the supply of different types of gases without replacing or modifying the rotating disc, and by simply positioning the rotating disc at different angular positions depending on the type of gas to be supplied. It is necessary to simply change the relative position of the rotating disc with respect to a reference position of the operating means. Therefore it is a solution that is easy to implement, having few parts required to be able to change the supply gas, which allows reducing valve costs.

These and other advantages and features will become evident in view of the drawings and the detailed description.

DETAILED DESCRIPTION

Figure 1:
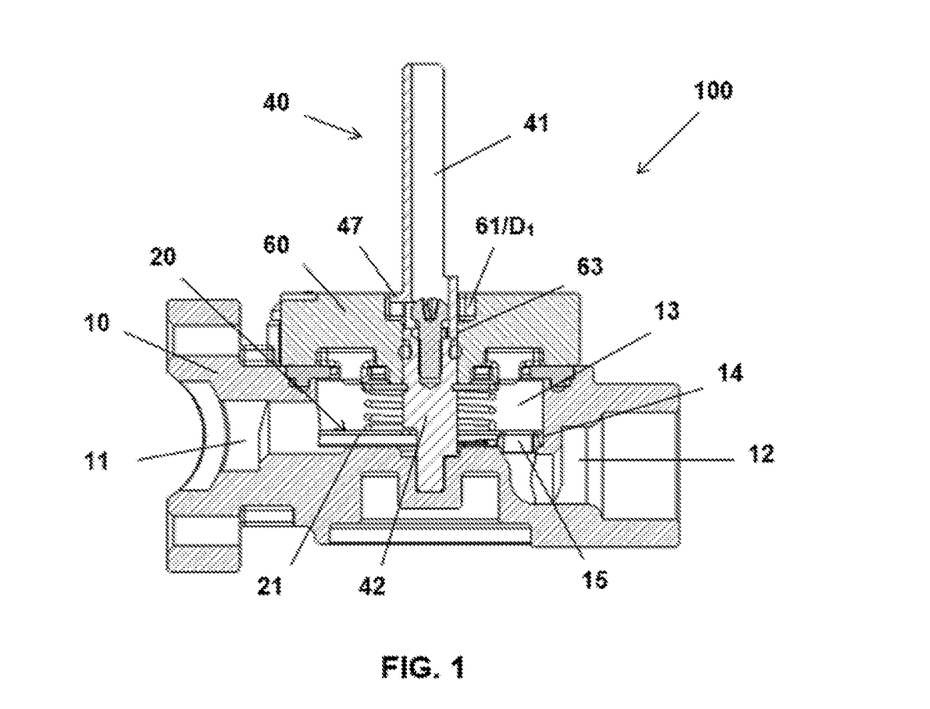
FIG. 1 shows a section view of a regulating valve according to a first embodiment.
Figure 2:
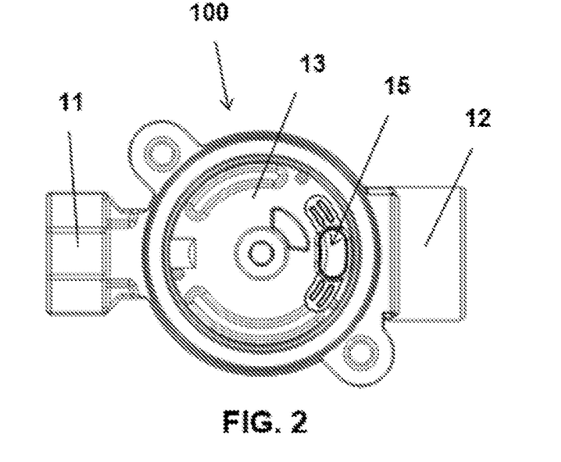
FIG. 2 shows a plan view of the valve of FIG. 1, in which the cover, the rotating disc, and the operating means have been removed.
Figure 3:
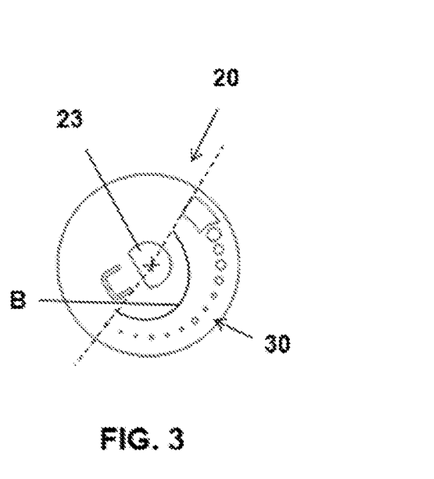
FIG. 3 shows a plan view of the rotating disc of the valve of FIG. 1.

FIG. 1 shows a section view of a first embodiment of a regulating valve 100, the regulating valve 100 being manually operated. FIG. 2 shows a plan view of the valve of FIG. 1, in which the cover 60, the rotating disc 20, and the operating means 40 of the valve 100 have been removed. FIG. 3 shows a plan view of the rotating disc 20 of the valve 100 of FIG. 1. The regulating valve 100 is intended for regulating the gas flow to a burner of a gas cooking appliance, the valve 100 being in fluid communication with the burner. The gas cooking appliance comprises a gas inlet conduit 11 communicating the regulating valve 100 with the main gas inlet of the gas cooking appliance.

The regulating valve 100 comprises a valve body 10 with an inlet conduit 11 through which gas is supplied and an outlet conduit 12 for the gas. The valve 100 comprises an inner cavity 13 which is in fluid communication with the inlet conduit 11, the inner cavity 13 comprising an outlet hole 15 in fluid communication with the outlet conduit 12. The valve 100 comprises a rotating disc 20 which in turn comprises a surface 21 which, as shown in FIG. 1, is the lower surface of the rotating disc 20, which is in contact with a contact surface 14 of the inner cavity 13 of the valve body 10. The inner cavity 13 of the valve 100 is formed in this embodiment of the valve 100 in a void of the valve body 10, a series of protuberances forming the contact surface 14 being arranged at the bottom of the void, the outlet hole 15 of the inner cavity 13 comprising therein or disposed about an elastomeric seal which provides a leak-tight seal between the lower surface 21 of the rotating disc 20 and the outlet conduit 12 of the valve body.

The rotating disc 20 is capable of rotating with respect to the contact surface 14 of the inner cavity 13, maintaining the leak-tightness between the surface 21 of the rotating disc 20 and the contact surface 14 of the inner cavity 13. In this embodiment of the valve 100, the rotating disc 20 comprises a plurality of connecting openings 30 that allow regulating the gas flow between the inner cavity 13 and the outlet conduit 12 of the valve body 10 by means of rotation of the rotating disc 20, and when the connecting openings 30 and the outlet hole 15 of the inner cavity 13 are arranged in fluidic communication. Furthermore, the regulating valve 100 comprises operating means 40 which is connected to the rotating disc 20 for rotating the rotating disc 20.

The valve 100 is adapted for supplying different types of combustible gas. In this embodiment of the valve 100, the valve 100 allows supplying a first type of gas such as natural gas NG, and a second and third type of gas both derived from liquefied gas LPG, such as propane and butane, respectively. To adapt the valve 100 to the corresponding gas supply, as will be explained in detail below, the rotating disc 20 is arranged in a different angular position $\alpha_1$, $\alpha_2$, $\alpha_3$ for each supply gas when the operating means 40 is arranged in a reference position D1 of the valve 100.

When the valve 100 is configured for use with one of the supply gases, for example for natural gas, the rotating disc 20 is arranged in an angular position α1 defined between the operating means 40 and the rotating disc 20 when the operating means 40 is in the reference position $D_1$. In order to switch to another type of supply gas, for example propane, the operating means 40 and the rotating disc 20 are decoupled from one another, i.e., they are separated, and the rotating disc 20 is repositioned with respect to the operating means 40. The operating means 40 and the rotating disc 20 are coupled to one another again. Therefore, when the operating means 40 is positioned in the reference position $D_1$, the rotating disc 20 is arranged in a new angular position α2 corresponding to propane gas.

In order to adapt to the different supply gases, the operating means 40 includes an actuating shaft 41 that can be rotated along an angular path A. This angular path A is demarcated by two stops 61, 62 arranged in a cover 60 of the valve 100. These two stops 61, 62 correspond with the reference position $D_1$ and another position $D_2$, respectively. The rotating disc 20 is attached to a coupling shaft 42 which is coupled to the actuating shaft 41 of the operating means 40. In order to help adapt the valve 100 to the three supply gases, i.e., natural gas, propane gas and butane gas, each of the gases may be identified on the upper outer surface of the cover 60 with the abbreviations G1, G2 and G3, respectively. The abbreviations G1, G2 and G3 are sometimes used hereafter to respectively refer to natural gas, propane gas and butane gas.

Figure 4:
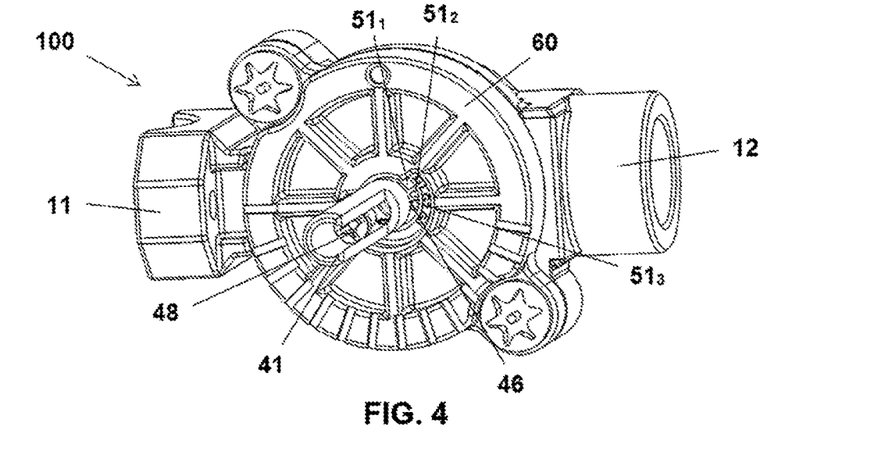
FIG. 4 shows a perspective view of the valve of FIG. 1, with the actuating shaft decoupled from the coupling shaft.
Figure 5:
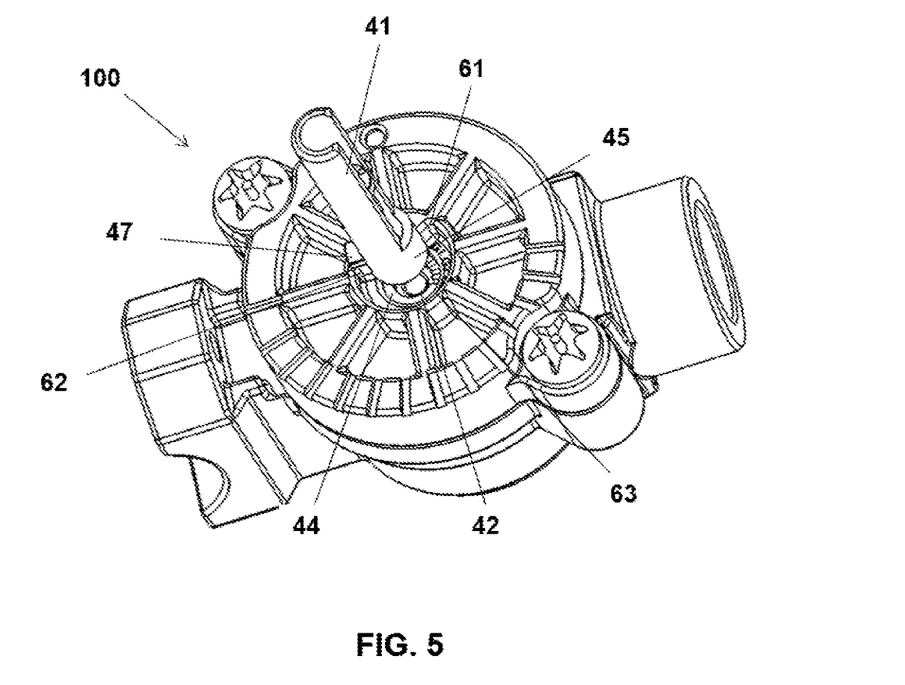
FIG. 5 shows another perspective view of the valve of FIG. 1, with the actuating shaft decoupled from the coupling shaft.
Figure 6:
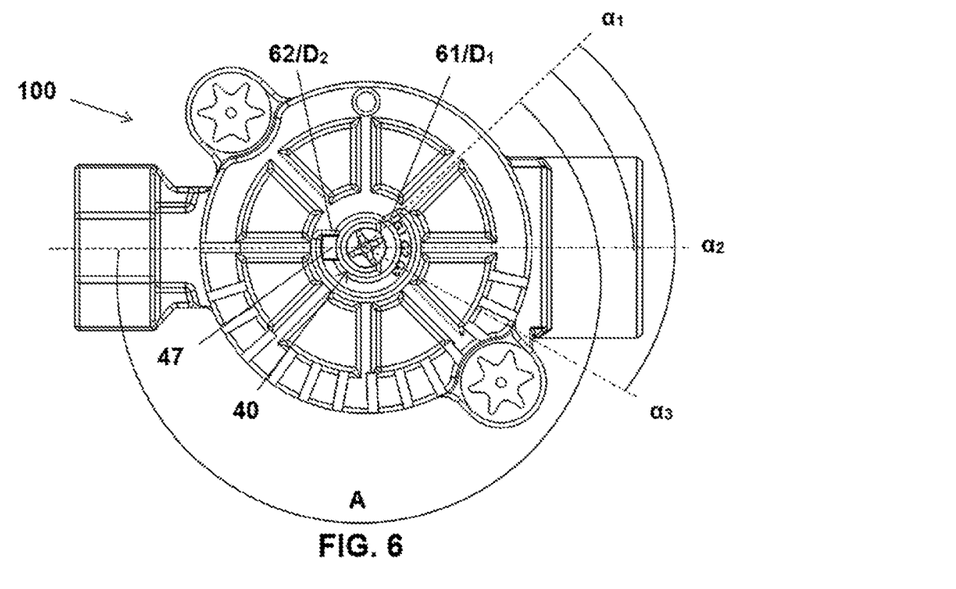
FIG. 6 shows a plan view of the valve of FIG. 1, with the actuating shaft and the coupling shaft coupled to one another.
Figure 7:
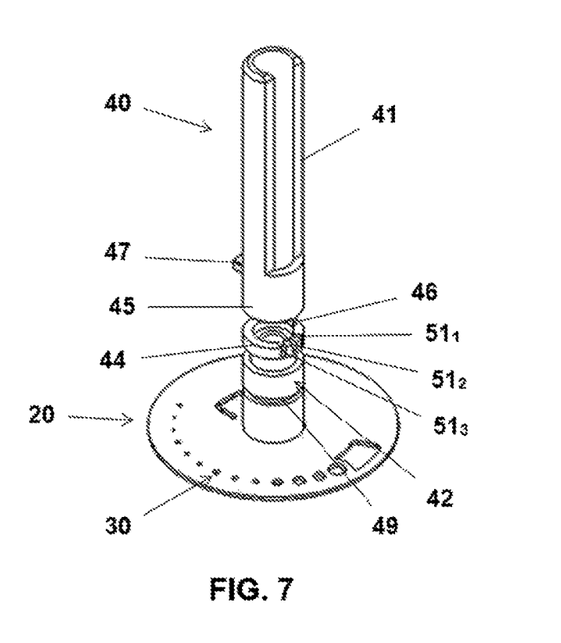
FIG. 7 shows a perspective view of the actuating shaft of the operating means and the coupling shaft of the rotating disc of the valve of FIG. 1 decoupled from one another.

FIG. 4 shows a perspective view of the valve 100 of FIG. 1, with the actuating shaft 41 decoupled from the coupling shaft 42. FIG. 5 shows another perspective view of the valve 100 of FIG. 1, with the actuating shaft 41 decoupled from the coupling shaft 42. FIG. 6 shows a plan view of the valve 100 of FIG. 1, with the actuating shaft 41 and the coupling shaft 42 coupled to one another. FIG. 7 shows a perspective view of the actuating shaft 41 of the operating means 40 and the coupling shaft 42 of the rotating disc 20 of the valve 100 of FIG. 1 decoupled from one another. In this embodiment of the valve 100, the angular path A corresponds with the path of the gas flow leaving the valve 100 between an OFF position, which corresponds with a position without any gas flow, and a minimum gas flow position, a maximum gas flow position and an intermediate gas flow position being located between the minimum and maximum gas flow positions. Reference position $D_1$ corresponds with the minimum outlet gas flow position, and position $D_2$ corresponds with the OFF position.

In this embodiment, the cover 60 of the regulating valve 100 is attached to the valve body 10 by means of two screws, an inner cavity 13 being formed inside the valve 100. The cover 60 comprises a hole 63 going through it, the coupling shaft 42 of the rotating disc 20 being housed in the hole 63 of the cover 60, going through it. The rotating disc 20 is previously coupled to the coupling shaft 42, the rotating disc 20 being housed in a perimetral groove 49, and a flat area of the outer surface of the coupling shaft 42 being coupled in a semicircular hole 23 of the rotating disc 20. Therefore, when assembling the rotating disc 20 in the valve 100, the rotating disc 20 is housed in the inner cavity 13, the surface 21 thereof being supported on the contact surface 14 of the inner cavity 13, and the coupling shaft 42 is housed in the hole 63 of the cover 60, an upper end 44 of the coupling shaft 42 being shown on the outside of the valve 100, through the hole 63 of the cover 60.

In this embodiment of the valve 100, the base of the upper end 44 of the coupling shaft 42 comprises three housings $51_1$, $51_2$ and $51_3$ corresponding to each of the three supply gases G1, G2 and G3, respectively, the housings $51_1$, $51_2$ and $51_3$ being in the form of a groove. These housings $51_1$, $51_2$ and $51_3$ are arranged in the corresponding different angular positions $\alpha_1$, $\alpha_2$, $\alpha_3$ of the rotating disc 20, the angular positions $\alpha_1$, $\alpha_2$, $\alpha_3$ being seen from the outside, when the actuating shaft 41 is coupled to the coupling shaft 42, by means of the position of the abbreviations G1, G2 and G3 of the different supply gases. Obviously other means of identifying the angular positions $\alpha_1$, $\alpha_2$, $\alpha_3$ are also possible. The angular position $\alpha_1$, $\alpha_2$, $\alpha_3$ of the rotating disc 20 for each of the respective gases G1, G2 and G3 is measured as a reference between the stop 61 and the angular position of each of the housings $51_1$, $51_2$ and $51_3$ or the corresponding position of each of the abbreviations G1, G2 and G3. Therefore, in this embodiment of the valve 100, if the angular separation between the housings $51_1$, $51_2$ and $51_3$ is, for example, 25°, the angular position $\alpha_1$ corresponds with an angle of 0°, and the angular positions $\alpha_2$ and $\alpha_3$ are at 25° and 50°, respectively.

The actuating shaft 41 comprises an axial stud 46 projecting in a lower end 45 from the base thereof, in the longitudinal direction of the actuating shaft 41, by way of a protuberance. It also comprises a radial stud 47, by way of a fin, projecting laterally in a specific angular path. When the axial stud 46 of the actuating shaft 41 is housed in the corresponding housing $51_1$, $51_2$ and $51_3$ of the coupling shaft 42, the radial stud 47 of the actuating shaft 43 is located on the surface of the cover 60, between the stops 61, 62 of the cover 60, the actuating shaft 41 being able to rotate between the stops 61, 62 in the angular path A, the radial stud 47 abutting with the stops 61, 62 at each of the ends of the angular path A.

In order to couple the actuating shaft 41 and the coupling shaft 42, the valve 100 comprises attachment means 48 which comprise a screw in this embodiment of the valve 100. The actuating shaft 41 is internally hollow and comprises a transverse wall with a hole that allows the passage of the threaded shaft of the screw 48 and the seating of the head thereof. In addition, the coupling shaft 42 comprises at its upper end 44 a longitudinal threaded hole that allows screwing in the screw 48. Therefore, in order to switch to another type of supply gas, for example from G1 to G2, in the valve 100, the actuating shaft 41 and the coupling shaft 42 are decoupled from one another, i.e., the screw 48 is loosened and they are separated. The axial stud 46 of the actuating shaft 41 is housed in the housing $51_2$ of the coupling shaft 42, and the actuating shaft 41 and the coupling shaft 42 have just been coupled to one another by attaching both by means of the screw 48, thereby repositioning the rotating disc 20 with respect to the actuating shaft 41 of the operating means 40. The radial stud 47 of the actuating shaft 43 is located on the surface of the cover 60, between the stops 61 and 62. The actuating shaft 41 is rotated and the radial stud 47 is positioned against the stop 61, which corresponds with reference position $D_1$. The rotating disc 20, which is coupled to the coupling shaft 42, is thereby repositioned angularly in a new angular position $\alpha_2$ corresponding to propane gas.

The valve 100 can be adapted in the same way to the different supply gases by positioning the actuating shaft 41 of the operating means 40 in position $D_2$ corresponding to the OFF position of the valve 100.

Figure 8:
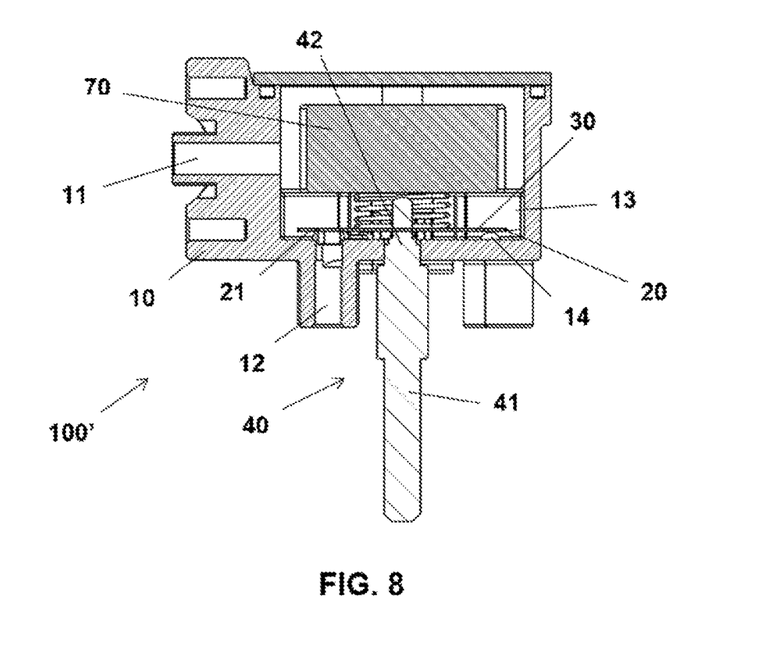
FIG. 8 shows a section view of a regulating valve according to a second embodiment.

FIG. 8 shows a regulating valve 100' according to a second embodiment. The valve 100' comprises the same elements as those described for the first embodiment of the valve 100, and the adaptation for supplying the different types of gas G1, G2 and G3 is done in the same way. In this second embodiment, the operating means 40 of the valve 100' also comprise a motor 70 connected with the rotating disc 20. The way to connect the motor 70 with the rotating disc 20 will be explained below with the description of the third embodiment of the regulating valve 100". This second embodiment of the valve 100' allows external control thereof, such that the gas flow of the valve 100' can be manually regulated by the user by means of the actuating shaft 41 of the operating means 40, or remotely controlled by acting on the motor 70, as will be explained below.

Figure 9:
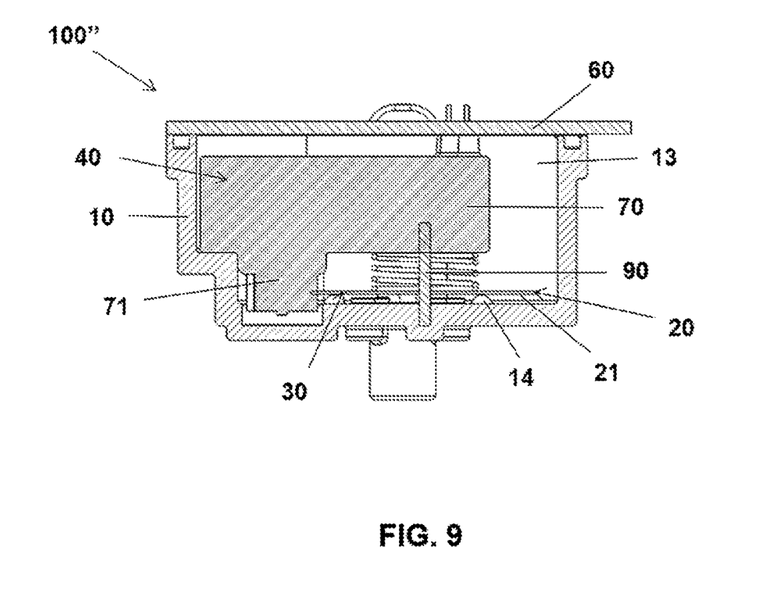
FIG. 9 shows a first section view of a regulating valve according to a third embodiment.
Figure 10:
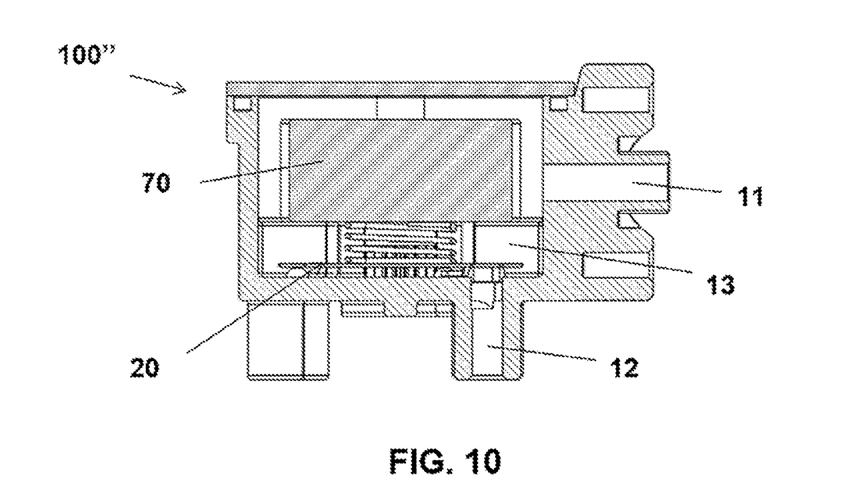
FIG. 10 shows a second section view of the third embodiment of the regulating valve of FIG. 9.

FIG. 9 shows a first section view of a regulating valve 100" according to a third embodiment, and FIG. 10 shows a second section view of the third embodiment of the regulating valve 100" of FIG. 9. In this third embodiment of the valve 100", the valve 100" also comprises a valve body 10 with a gas inlet conduit 11, a gas outlet conduit 12, and an inner cavity 13 demarcated by a cover 60 of the valve 100" and the valve body 10. The valve also comprises a rotating disc 20 with a surface 21 in contact with a contact surface 14 of the inner cavity 13. The rotating disc 20 is capable of rotating with respect to the contact surface 14, the surface 21 of the rotating disc 20 and the contact surface 14 of the inner cavity 13 being arranged in a leak-tight manner.

Figure 11:
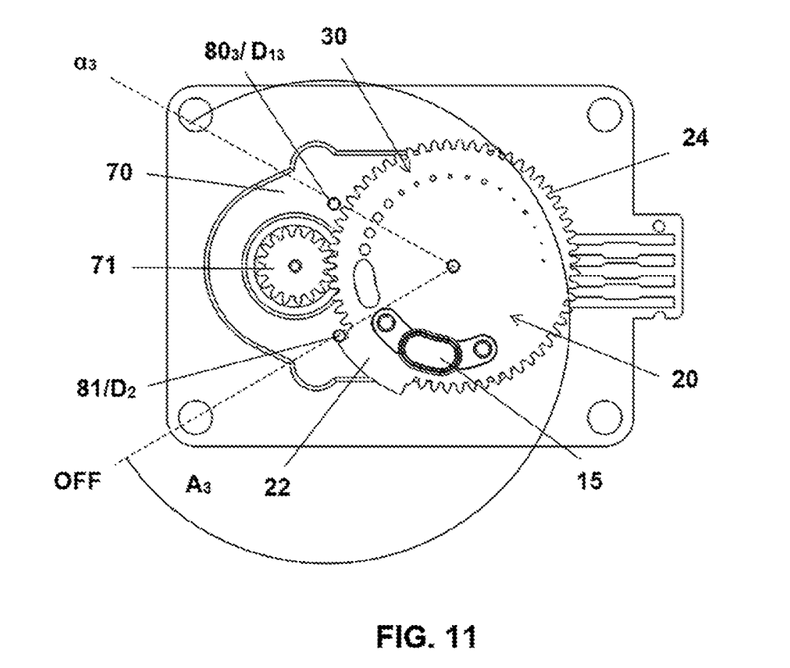
FIG. 11 shows a bottom plan view of the valve of FIG. 9, in which the valve body has been removed, the valve being regulated for butane gas, and the valve is in the OFF position.
Figure 12:
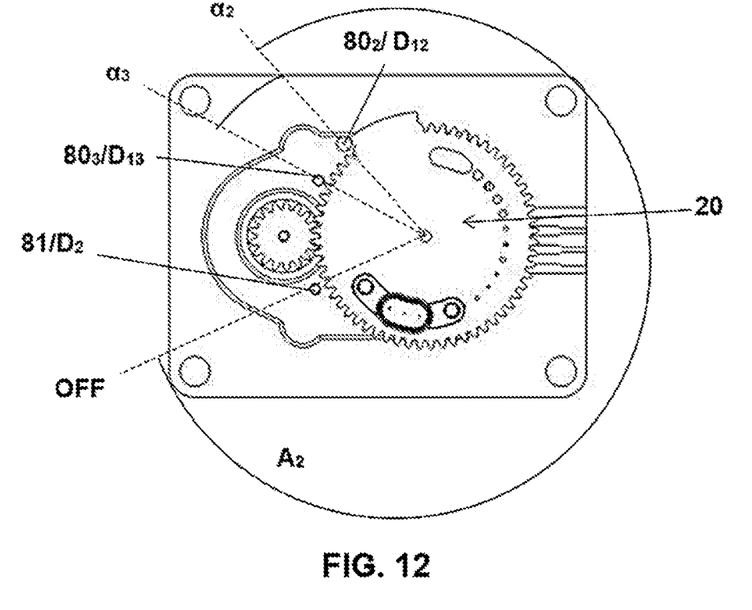
FIG. 12 shows a bottom plan view of the valve of FIG. 9, in which the valve body has been removed, the valve being regulated for propane gas, and the valve is in the minimum gas flow position.
Figure 13:
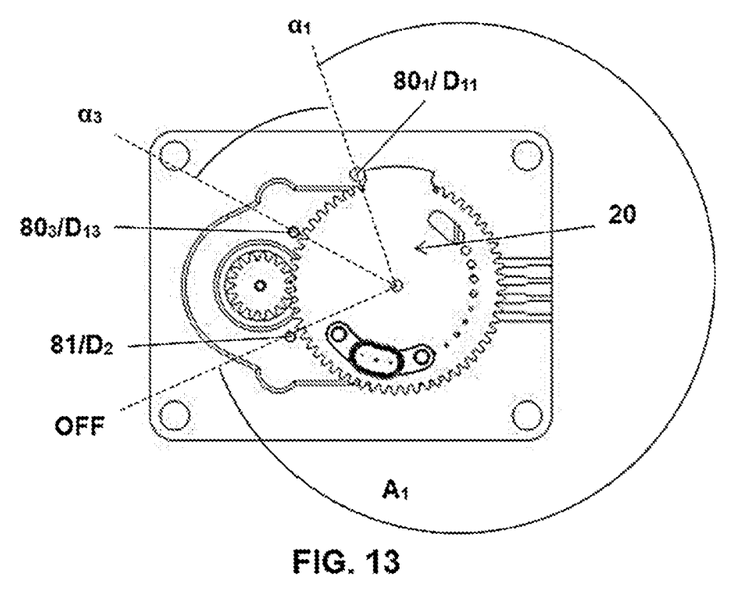
FIG. 13 shows a bottom plan view of the valve of FIG. 9, in which the valve body has been removed, the valve being regulated for natural gas, and the valve is in the minimum gas flow position.

FIG. 11 shows a bottom plan view of the valve 100" of FIG. 9, in which the valve body 10 has been removed, the valve 100" being regulated for butane gas and the valve 100" being in the minimum position. FIG. 12 shows a bottom plan view of the valve 100" of FIG. 9, in which the valve body 10 has been removed, the valve 100" being regulated for propane gas and the valve 100" being in the minimum position, and FIG. 13 shows a bottom plan view of the valve 100" of FIG. 9, in which the valve body 10 has been removed, the valve 100" being regulated for natural gas, and the valve 100" being in the minimum position.

The rotating disc 20 comprises a plurality of connecting openings 30 that allow regulating the gas flow of the valve 100" between the inner cavity 13 and the outlet conduit 12 by means of rotation of the rotating disc 20, and when the connecting openings 30 and an outlet hole 15 of the inner cavity 13 are in fluid communication. The valve 100" comprises operating means 40 connected to the rotating disc 20 for rotating the rotating disc 20. The valve 100" is adapted for supplying different types of combustible gas G1, G2 and G3, the rotating disc 20 being arranged in a different angular position $\alpha_1$, $\alpha_2$ and $\alpha_3$, depending on the type of gas to be supplied, when the operating means 40 is arranged in a reference position $D_1$.

In this third embodiment of the valve 100", to switch from one type of gas to another the reference position $D_1$ for each of the supply gases G1, G2 and G3 of the operating means 40 is modified, the different reference positions being $D_1$, $D_2$, $D_3$, respectively, such that once the reference position is modified, the angular position $\alpha_1$, $\alpha_2$ and $\alpha_3$ of the rotating disc 20 is different when the operating means 40 is arranged in the reference positions $D_1$, $D_2$, $D_3$.

The reference positions $D_1$, $D_2$, $D_3$ are defined by means of stops 801, 802, 803 of the valve 100", which can be added or removed. To adapt it to the different supply gases, the operating means 40 comprises a motor 70 connected with the rotating disc 20. In this valve 100", as well as in the valve 100' of the second embodiment, the rotating disc 20 comprises a serrated edge 24, and the motor 70 comprises an output which is a rotary gear 71. Therefore, the rotary gear 71 of the motor 70 and the serrated edge 24 of the rotating disc 20 engage one another, which allows rotation of the motor 70 to be translated into rotation of the rotating disc 20. Furthermore, the valve 100" comprises a connecting shaft 90 which allows connecting the motor 70 with the center of the rotating disc 20, which allows matching the rotation by the rotary gear 71 on the rotating disc 20. The rotation of the rotating disc 20 takes place along an angular path $A_1, A_2, A_3$ corresponding to each of the supply gases G1, G2, G3. This angular path $A_1, A_2, A_3$ is demarcated at one end with a closing stop 81 for the different gases G1, G2 and G3, and at the other end with stops $80_1, 80_2, 80_3$, using the center of the rotating disc 20 as a reference. A projection 22 of the rotating disc 20 interacts with the stops $80_1, 80_2, 80_3$. The stops $80_1, 80_2, 80_3$ and the closing stop 81 correspond with reference positions $D_1, D_2, D_3$ and position $D_2$, respectively.

In this embodiment of the valve 100", each of the angular paths $A_1, A_2, A_3$ corresponds, for each of the supply gases G1, G2 and G3, respectively. The angular paths $A_1, A_2, A_3$ extend between an OFF position which corresponds with the position without any gas flow, and a minimum gas flow position, a maximum gas flow position and an intermediate gas flow position located between the minimum and maximum gas flow positions. Reference positions $D_1, D_2, D_3$ correspond with the minimum outlet gas flow position, and position $D_2$ corresponds with the OFF position of the valve 100".

The angular position $\alpha_1, \alpha_2$ and $\alpha_3$ of the rotating disc 20 for each of the respective gases G1, G2 and G3, is measured as a reference between the stop $80_3$, which corresponds to the minimum gas flow for the gas G3, and the angular position of each of the stops $80_1, 80_2, 80_3$. Therefore, in this embodiment of the valve 100", if the angular separation between the stops $80_1, 80_2, 80_3$ is 25°, for example, the angular position $\alpha_1$ corresponds with an angle of 50°, and the angular positions $\alpha_2$ and $\alpha_3$ are at 25° and 0°, respectively.

Therefore, in order to switch to another type of supply gas, for example from G1 to G2, in the valve 100", the stop $80_1$ corresponding to the minimum gas flow for G1 is removed, and the stop $80_2$ corresponding to the minimum gas flow for G2 is added, the motor 70 is operated and rotates the rotating disc 20 until the projection 22 of the rotating disc 20 interacts with the stop $80_2$. Therefore, the rotating disc 20 is repositioned at angular position $\alpha_2$. The rotating disc 20 can be rotated from the position until the position of the closing stop 81 in order to change the gas flow of the valve 100" with gas G2.

Figure 14A:
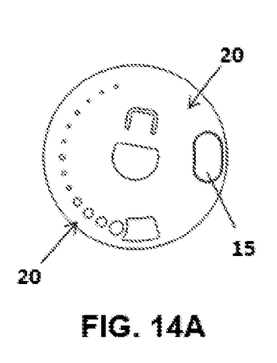
FIGS. 14A-C show the position of the holes of the connecting opening of the rotating disc with respect to the outlet hole of the inner cavity of the valves of FIGS. 1 and 8 for natural, propane and butane gases, respectively, when the valves are in the OFF position.
Figure 14B:
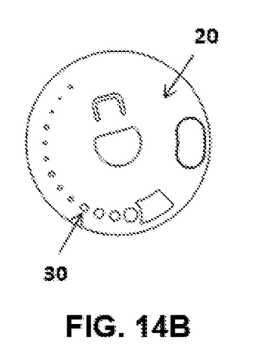
Figure 14C:
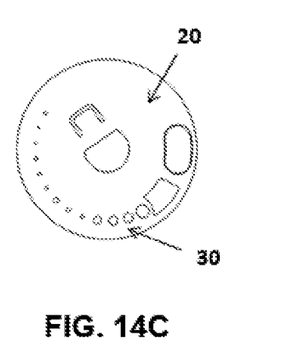
Figure 15A:
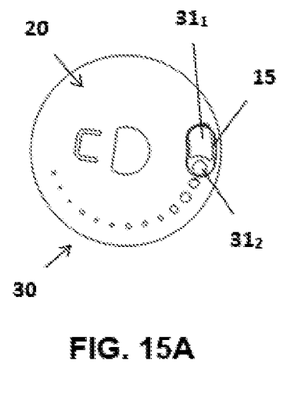
FIGS. 15A-C show the position of the holes of the connecting opening of the rotating disc with respect to the outlet hole of the inner cavity of the valves of FIGS. 1 and 8 for natural, propane and butane gases, respectively, when the valves are in the maximum position.
Figures 15B, 15C:
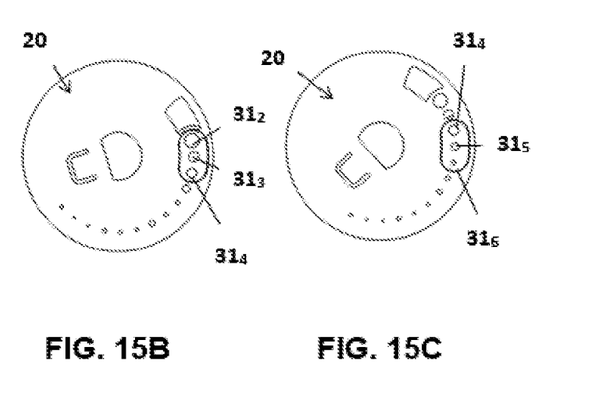
Figure 16A:
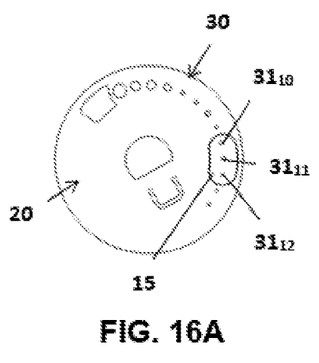
FIGS. 16A-C show the position of the holes of the connecting opening of the rotating disc with respect to the outlet hole of the inner cavity of the valves of FIGS. 1 and 8 for natural, propane and butane gases, respectively, when the valves are in the minimum position.
Figures 16B, 16C:
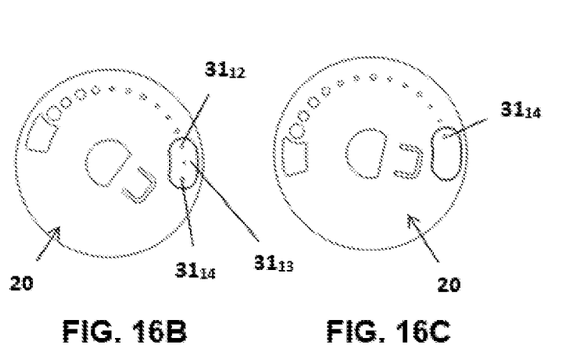
Figure 17:
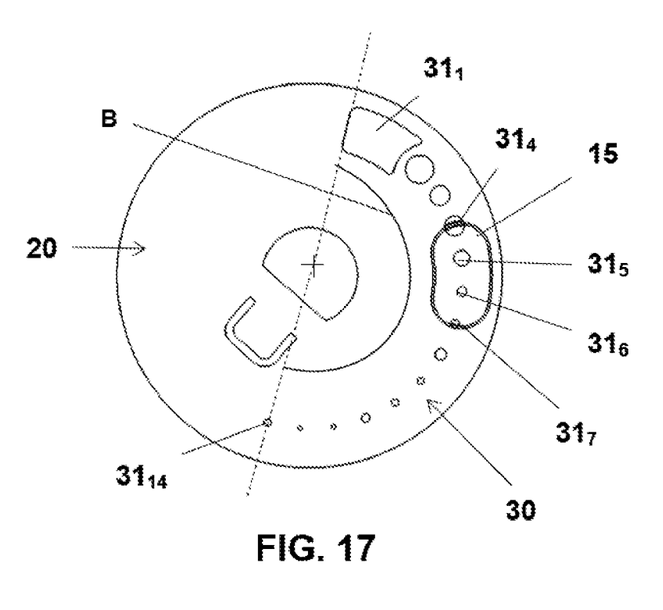
FIG. 17 shows the overlap position of the holes of the connecting opening of the rotating disc with respect to the outlet hole of the inner cavity of the valves of FIGS. 1 and 8 when changing the gas flow for natural, propane and butane gases.

FIGS. 14A-C show the position of holes $31_1$-$31_N$, of the connecting openings 30 of the rotating disc 20 with respect to the outlet hole 15 of the inner cavity 13 of the valves 100 and 100' of FIGS. 1 and 8 for natural, propane and butane gases, G1, G2 and G3, respectively, when the valves 100 and 100' are in the OFF position. FIGS. 15A-C show the position of holes $31_1$-$31_n$, of the connecting openings 30 of the rotating disc 20, with respect to the outlet hole 15 of the inner cavity 13 of the valves 100 and 100' of FIGS. 1 and 8 for natural, propane and butane gases, G1, G2 and G3, respectively, when the valves 100 and 100' are in the maximum gas flow position. FIGS. 16A-C show the position of holes $31_1$-$31_n$, of the connecting opening 30 of the rotating disc 20 with respect to the outlet hole 15 of the inner cavity 13 of the valves 100 and 100' of FIGS. 1 and 8 for natural, propane and butane gases G1, G2 and G3, respectively, when the valves 100 and 100' are in the minimum gas flow position. In turn, FIG. 17 shows the overlap position of holes $31_1$-$31_n$ of the connecting opening 30 of the rotating disc 20 with respect to the outlet hole 15 of the inner cavity 13 of the valves 100 and 100' of FIGS. 1 and 8 when the gas flow is changed for natural, propane and butane gases G1, G2 and G3.

In any of the embodiments of the regulating valve 100, 100', and 100" described above, the inner cavity 13 of the valve body 10 comprises an outlet hole 15 in fluid communication with the outlet conduit 12. The rotating disc 20 comprises the connecting openings 30, the connecting openings 30 in these embodiments of the valve 100, 100' and 100" comprising a plurality of holes $31_1$-$31_n$, having different sections arranged in an angular path B, this angular path B being smaller than or the same as angular path A. Specifically, in the valves 100 and 100' shown the rotating disc 20 comprises n=14 holes, and valve 100" comprises n=17 holes. The holes $31_1$-$31_n$ have different diameters, hole $31_1$ in the valves 100, 100', and 100" having a different irregular shape. The order in which the holes $31_1$-$31_n$ are arranged in the angular path B is not related to having an increasing or decreasing section, but rather the sections of the holes $31_1$-$31_n$ are combined such that the gas flow of the valve 100, 100' and 100" can be regulated between the OFF position and the minimum flow position, and in the inverse order, continuously and obtaining the same regulating positions with the operating means 40 for the different supply gases G1, G2 and G3.

In these embodiments of the valves 100, 100' and 100", the regulation of the gas flow for the different supply gases G1, G2 and G3 is obtained by a number of three consecutive holes out of n holes $31_1$-$31_n$ of the connecting opening 30 of the rotating disc 20 overlapping with the outlet hole 15. The rule is complied with except at the beginning and end of the angular path B of the connecting opening 30, specifically for the maximum outlet flow for gas G1 and for the minimum outlet flow for gas G3. The changes in gas flow between one specific flow rate and another flow rate are obtained by means of the exit of one hole of one end of the three holes overlapping with the outlet hole 15, and by means of the entry of a new hole with respect to the other end of the outlet hole 15 at the same time.

In another motor-powered embodiment of the valve 100" (not shown in the drawings), the valve does not comprise the stops $80_1, 80_2, 80_3$. Regulating the gas flow in the different positions of the valve between the OFF position and the minimum gas flow position is done with the motor 70 controlled by an electronic control of the gas appliance where the valve is assembled, and which will be described below. The electronic control determines in which position the motor 70 must stop when operating the rotating disc 20 and the connecting opening 30 of the rotating disc 20 is thereby positioned with respect to the outlet hole 15. The valve is adapted to the different supply gases by means of controlling the electronic control on the motor 70 and positioning the rotating disc 20 by means of the motor 70 in the different angular paths $A_1, A_2, A_3$ defined for each of the respective gases G1, G2 and G3. The closing stop 81 is used as a reference position for the electronic control for determining the different angular paths $A_1, A_2, A_3$. The valve may not have the closing stop 81, in which case the reference position can be any other element of the valve defined for the function, or even a virtual reference position.

FIGS. 18A-E show the position of the holes $31_{1-1}$-$31_{1-7}$ and $31_{2-1}$-$31_{2-8}$ of two sets of connecting openings $30_1$ and $30_2$ of the rotating disc 20 of a fourth embodiment of the regulating valve comprising two outlet conduits, each with its respective outlet hole $15_1$ and $15_2$: an outer gas outlet conduit and an inner gas outlet conduit. FIGS. 18A-E show, respectively, the valve in an OFF position, in a maximum gas flow position for the outer outlet conduit and maximum gas flow position for the inner outlet conduit, in a minimum position for the outer outlet conduit and a maximum position for the inner outlet conduit, in an OFF position for the outer outlet conduit and an intermediate gas flow position for the inner outlet conduit, and in an OFF position for the outer outlet conduit and a minimum position for the inner outlet conduit.

This fourth embodiment of the regulating valve is similar to valves 100 and 100', although it is can also be applied to the motor-powered valve 100", the valve comprising a valve body with two outlet conduits and a corresponding number of outlet holes $15_1$ and $15_2$, the outlet holes $15_1$ and $15_2$ in fluid communication with the outlet conduits. Each valve supplies gas to a burner, this burner being able to have one or several rings. Each of the gas outlet conduits of the valve supplies gas to each of the rings. Therefore, in this fourth embodiment the valve comprises two gas outlet conduits, an outer outlet conduit for the outer ring of the burner, and an inner outlet conduit for the inner ring of the burner.

Depending on the position of the operating means 40 of the valve, the user can select the regulation of the gas flow of the two rings of the burner. When the user selects any of the gas flow regulating positions, there is fluidic communication between the outlet conduits of the valve and two connecting openings $30_1$ and $30_2$ comprised in the rotating disc 20 through the respective outlet holes $15_1$ and $15_2$, communicating opening $30_1$ with the inner outlet conduit and opening $30_2$ with the outer outlet conduit.

Each set of connecting openings $30_1$ and $30_2$ comprises a plurality of holes $31_{1-1}$-$31_{1-n}$ and $31_{2-1}$-$31_{2-n}$ having different sections arranged in respective angular paths $B_1$ and $B_2$. These angular paths $B_1$ and $B_2$ are arranged in different radii with respect to the center of the rotating disc 20. These angular paths $B_1$ and $B_2$ are smaller than or at most the same as angular path A of manually operated valves, or the same as or smaller than the angular paths $A_1, A_2, A_3$ of electrically operated motor-powered valves.

The outlet holes $15_1$ and $15_2$ are arranged in the valve body in a radial and angular position with respect to the rotating disc 20 such that rotation of the rotating disc 20 allows fluidly communicating the outlet holes $15_1$ and $15_2$ successively with the respective connecting openings $30_1$ and $30_2$. Specifically, the rotating disc 20 comprises n=7 holes in connecting opening $30_1$ and comprises n=8 holes in connecting opening $30_2$. The holes $31_{1-1}$-$31_{1-7}$ and $31_{2-1}$-$31_{2-8}$ have different diameters, the holes $31_{1-1}$-$31_{1-7}$ and $31_{2-1}$-$31_{2-8}$ having a different irregular and elongated shape. The order in which the holes $31_{1-1}$-$31_{1-7}$ and $31_{2-1}$-$31_{2-8}$ are arranged in the angular paths B1 and B2 is not related to having an increasing or decreasing section, but rather the sections of the holes $31_{1-1}$-$31_{1-7}$ and $31_{2-1}$-$31_{2-8}$ are combined such that the gas flow of the valve can be regulated between the OFF position and the minimum flow position, and in the inverse order, continuously and obtaining the same regulating positions with the operating means 40 for the different supply gases G1, G2 and G3.

Therefore, and as shown in FIGS. 18A-E, in one embodiment of the rotating disc 20 and the valve adapted for natural gas G1, in the OFF position of the valve the connecting openings $30_1$ and $30_2$ are not in fluid communication with the outlet holes $15_1$ and $15_2$. Therefore, there is no gas flow to the burner.

Figure 18A:
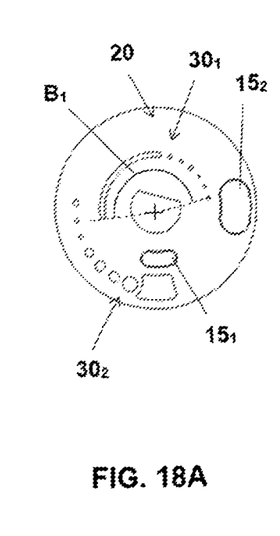
FIGS. 18A-E show the position of the holes of the two connecting openings of the rotating disc of a fourth embodiment of the regulating valve, with an outer gas outlet conduit and an inner gas outlet conduit with respect to the two outlet holes of the inner cavity of the valve regulated for natural gas when the valve is in an OFF position, in a maximum gas flow position for the outer outlet conduit and a maximum gas flow position for the inner outlet conduit, in a minimum position for the outer outlet conduit and a maximum position for the inner outlet conduit, in an OFF position for the outer outlet conduit and an intermediate gas flow position for the inner outlet conduit, and in an OFF position for the outer outlet conduit and a minimum position for the inner outlet conduit.
Figure 18B:
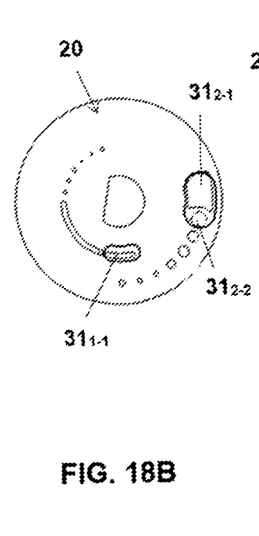

When the valve is in a maximum gas regulating position for the outer outlet conduit and a maximum position for the inner outlet conduit, the holes $31_{1-1}$, partially, and $31_{2-1}$ and $31_{2-2}$ are communicated, respectively, with the outlet holes $15_1$ and $15_2$.

Figure 18C:
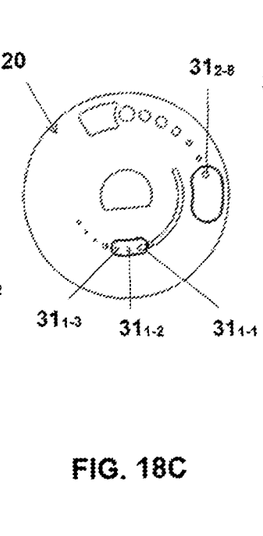

When the valve is in a minimum gas regulating position for the outer outlet conduit and a maximum position for the inner outlet conduit, the holes $31_{1-1}$, partially, and the holes $31_{1-2}$ and $31_{1-3}$, and hole $31_{2-8}$ are communicated, respectively, with the outlet holes $15_1$ and $15_2$.

Figure 18D:
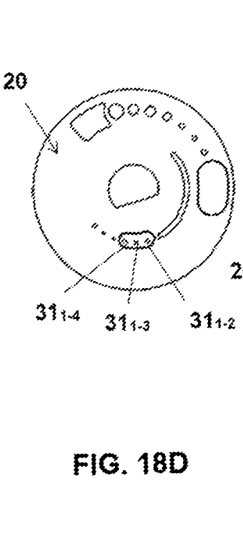

When the valve is in an OFF regulating position for the outer outlet conduit and an intermediate gas flow position for the inner outlet conduit, the holes $31_{1-2}$, $31_{1-3}$ and $31_{1-4}$, and no hole in opening $30_2$ are communicated, respectively, with the outlet holes $15_1$ and $15_2$.

Figure 18E:
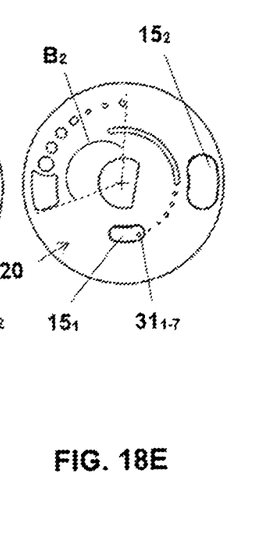

When the valve is in an OFF regulating position for the outer outlet conduit and a minimum position for the inner outlet conduit, the hole $31_{1-7}$, and no hole in the opening $30_2$ are communicated, respectively, with the outlet holes $15_1$ and $15_2$.

Continuous gas flow regulation is thereby obtained in each of the rings of the burner, and an overlap, and therefore the flame does not jump in the burner between the rings of the burner.

Figure 19:
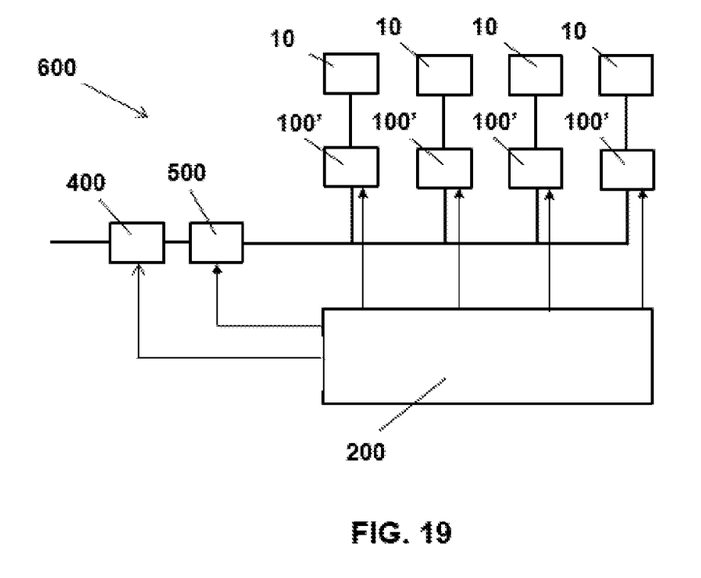
FIG. 19 shows a schematic depiction of a gas cooking appliance incorporating regulating valves.

The invention also relates to a gas cooking appliance incorporating regulating valves according to those disclosed herein. By way of illustration, FIG. 19 shows a schematic block depiction of a gas cooking appliance 600. In the example of FIG. 19, the gas cooking appliance 600 comprises four burners 10, each with a respective regulating valve 100" according to the third embodiment of the invention. There are arranged in the gas inlet conduit, in a position before the regulating valves 100", a cutoff valve 400 and then a safety valve 500. The gas cooking appliance 600 further comprises a control unit 200 controlling the regulating valves 100". The control unit 200 receives the orders that the user enters through a user interface (not depicted in the drawings). If regulating valves 100 according to the first embodiment are used, there will not be a control device 200 acting on the valves because the user would act directly on the regulating valves. If regulating valves 100' according to the second embodiment are used, the general scheme is the same as that of FIG. 19.

The gas cooking appliance can be, for example, a gas cooktop, a gas cooker, a gas oven or a grill. The number of regulating valves comprised in the gas appliance will correspond with the number of gas burners comprised in the gas appliance.

What is claimed is:

1. A gas regulating valve capable of regulating a flow of a first gas and a flow of a second gas, the gas regulating valve comprising:
   a valve body having an inlet conduit through which gas is supplied, a first outlet conduit and an inner cavity in fluid communication with the inlet conduit, the valve body including a first internal through hole that fluidly communicates the inner cavity with the first outlet conduit;
   a rotating disc including a first plurality of connecting holes of different sizes arranged in a first angular path, the rotating disc rotatable in the inner cavity to cause an overlap of at least one or more of the first plurality of connecting holes with the first inner through hole of the valve body to cause the inner cavity to be in fluid communication with the first outlet conduit to regulate the flow of the first gas or to regulate the flow of the second gas, the rotating disc having a surface in contact with a surface of the valve body that at least partially demarcates the inner cavity and rotatable with respect to the surface of the valve body, a leak-tight seal existing between the surface of the rotating disc and the surface of the valve body; and a rotatable actuating shaft having a central axis and coupled to the rotating disc in manner that results in a rotation of the rotating disc upon there being a rotation of the actuating shaft, the actuating shaft capable of assuming a first angular position and a second angular position with respect to the rotating disc, the first angular position corresponding to the regulation of the flow of the first gas through the regulation valve through use of a first set of the first plurality of connecting holes in the rotating disc, the second angular position corresponding to the regulation of the flow of the second gas through the regulation valve through use of a second set of the first plurality of connecting holes in the rotating disc, the second set of the first plurality of connecting holes being different than the first set of the first plurality of connecting holes, the first and second sets having in common some of the first plurality of connecting holes.

2. The regulating valve according to claim 1, wherein the rotating disc is coupled with a coupling shaft and does not rotate with respect to the coupling shaft, the rotating disc configured to rotate in unison with the coupling shaft, the actuating shaft being removably coupled to the coupling shaft.

3. The regulating valve according to claim 2, wherein the coupling shaft includes first and second housings that are arranged in the coupling shaft at different angular positions, the actuating shaft having a part that is configured to fit inside one or the other of the first and second housings, when the part of the actuating shaft is fit inside the first housing the actuating shaft is in the first angular position with respect to the rotating disc, when the part of the actuating shaft is fit inside the second housing the actuating shaft is in the second angular position with respect to the rotating disc.

4. The regulating valve according to claim 3, further comprising a cover attached to the valve body, the cover at least partially demarcating the inner cavity, the cover having a through opening through which at least a portion of the coupling shaft passes.

5. The regulating valve according to claim 4, wherein the coupling shaft has an end portion that protrudes from the through opening of the cover, the end portion comprising the first and second housings.

6. The regulating valve according to claim 3, wherein the part of the actuating shaft that is configured to fit inside one or the other of the first and second housings comprises an axial stud projecting from an end of the actuating shaft.

7. The regulating valve according to claim 3, wherein the actuating shaft includes a radial stud that projects laterally from the actuating shaft, the cover including angularly separated first and second end stops, the actuating shaft rotatable between the first and second end stops, when the radial stud abuts the first end stop the rotating disc is in a first control position corresponding to a regulating of a minimum gas flow through the regulating valve, when the radial stud abuts the second stop the rotating disc is in a second control position corresponding to there being no gas flow through the regulating valve with none of the connecting holes of the rotating disc overlapping with the first internal through opening of the valve body.

8. The regulating valve according to claim 2, wherein the actuating shaft is removably coupled to the coupling shaft by use of a screw.

9. The regulating valve according to claim 1, wherein the valve body includes a second outlet conduit and a second internal through hole that fluidly communicates the inner cavity with the second outlet conduit, the rotating disc having a second plurality of connecting holes of different sizes arranged in a second angular path different than the first angular path, the rotating disc rotatable in the inner cavity to cause an overlap of at least one or more of the second plurality of connecting holes with the second inner through hole of the valve body to cause the inner cavity to be in fluid communication with the second outlet conduit to regulate the flow of the first gas or to regulate the flow of the second gas to the second outlet conduit.

10. The regulating valve according to claim 9, wherein the second angular path is located radially inward of the first angular path.

11. The regulating valve according to claim 10, wherein at least a portion of each first and second angular paths overlap one another in a rotational direction of the rotating disc.

12. The regulating valve according to claim 9, wherein the rotating disc is capable of assuming a first position in which none of the first plurality of connecting holes overlap with the first internal through opening of the valve body and none of the second plurality of connecting holes overlap with the second internal through opening of the valve body.

13. The regulating valve according to claim 9, wherein the rotating disc is capable of assuming a second gas flow position in which a largest of the first plurality of connecting holes overlaps with the first internal through opening of the valve body and a largest of the second plurality of connecting holes overlaps with the second internal through opening of the valve body.

14. The regulating valve according to claim 9, wherein the rotating disc is capable of assuming a third gas flow position in which at least three of the first plurality of connecting holes overlap with the first internal through opening of the valve body and/or at least three of the second plurality of connecting holes overlap with the second internal through opening of the valve body.

15. The regulating valve according to claim 9, wherein the rotating disc is capable of assuming a fourth gas flow position in which none of the first plurality of connecting holes overlap with the first internal through opening of the valve body and a smallest of the second plurality of connecting holes overlaps with the second internal through opening of the valve body.

16. The regulating valve according to claim 9, wherein the rotating disc is capable of assuming a fifth gas flow position in which only one of the first plurality of connecting holes overlaps with the first internal through opening of the valve body and at least three of the second plurality of connecting holes overlaps with the second internal through opening of the valve body.

17. The regulating valve according to claim 1, wherein the first gas is natural gas and the second gas is propane gas.

18. The gas regulating valve according to claim 1, wherein the gas regulating valve is capable of regulating a flow of a third gas, the actuating shaft capable of assuming a third angular position with respect to the rotating disc, the third angular position corresponding to the regulation of the flow of the third gas through the regulation valve through use of a third set of the first plurality of connecting holes in the rotating disc, the third set of the first plurality of connecting holes being different than each of the first and second sets of the first plurality of connecting holes, the first, second and third sets having in common some of the first plurality of connecting holes.

19. The regulating valve according to claim 18, wherein the first gas is natural gas, the second gas is propane gas and the third gas is butane gas.

20. The regulating valve according to claim 1, wherein the rotating disc is capable of assuming a gas flow position wherein two of the first plurality of connecting holes fully overlap with the first internal through opening of the valve body and an additional two of the plurality of connecting holes only partially overlap with the first internal through opening of the valve body.

* * * * *